(12) United States Patent
Moe et al.

(10) Patent No.: US 12,706,928 B2
(45) Date of Patent: Aug. 11, 2026

(54) ENHANCED MESSAGE CONTENT SECURITY

(71) Applicant: T-Mobile USA, Inc., Bellevue, WA (US)

(72) Inventors: Alan Jonathan Moe, Seattle, WA (US); Brian Scott Ryerson, Platte City, MO (US); William Wheat, Greenbank, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

(21) Appl. No.: 18/756,488

(22) Filed: Jun. 27, 2024

(65) Prior Publication Data

US 2026/0006041 A1 Jan. 1, 2026

(51) Int. Cl.
*H04L 9/40* (2022.01)

(52) U.S. Cl.
CPC ................................ *H04L 63/1416* (2013.01)

(58) Field of Classification Search
CPC .................................................. H04L 63/1416
See application file for complete search history.

(56) References Cited

U.S. PATENT DOCUMENTS 12,028,372 B1 * 7/2024 Dasbach ............. H04L 63/1483
2013/0018906 A1 * 1/2013 Nigam .................. H04L 51/212 707/758
2015/0007312 A1 * 1/2015 Pidathala ............ H04L 63/1433 726/22
2015/0169741 A1 * 6/2015 Khan .................... G06F 16/951 707/749
2020/0404000 A1 * 12/2020 Hayes ................... G06F 21/567
2021/0266338 A1 * 8/2021 Drake ................. H04L 63/1441
2025/0184349 A1 * 6/2025 Singh ...................... G06F 40/30

* cited by examiner

*Primary Examiner* — Linglan Edwards
*Assistant Examiner* — Tafhimul Hoque
(74) *Attorney, Agent, or Firm* — Lee & Hayes, P.C.

(57) ABSTRACT

Systems and methods for redacting malicious URLs and other activatable content from messages are disclosed. A content analysis system may receive a text message or a multimedia message and determine whether a URL is contained in such a message. If so, the content analysis system may determine the maliciousness of the URL using various techniques, redacting the URL from the message before providing it to the user device if the URL is determined to be malicious. The original message may be stored for user access if desired.

17 Claims, 6 Drawing Sheets

ENHANCED MESSAGE CONTENT SECURITY

BACKGROUND

The number of wireless communications devices in use has grown exponentially, along with the number of communications networks used to support such devices. These devices facilitate various forms of communication, including text messaging and forms of one-to-one messaging. Messages sent using messaging technology can include content that, when activated, causes a user's device to perform certain actions. For example, a text message may include a uniform resource locator (URL) that, when activated by a user, cause a browser at the user's device to access a website or server indicated in the URL and/or perform one or more other actions based on the URL. It is currently difficult to ensure that URLs and other content included with messages are safe and/or secure and to prevent the proliferation of malicious content that may be included within messages.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
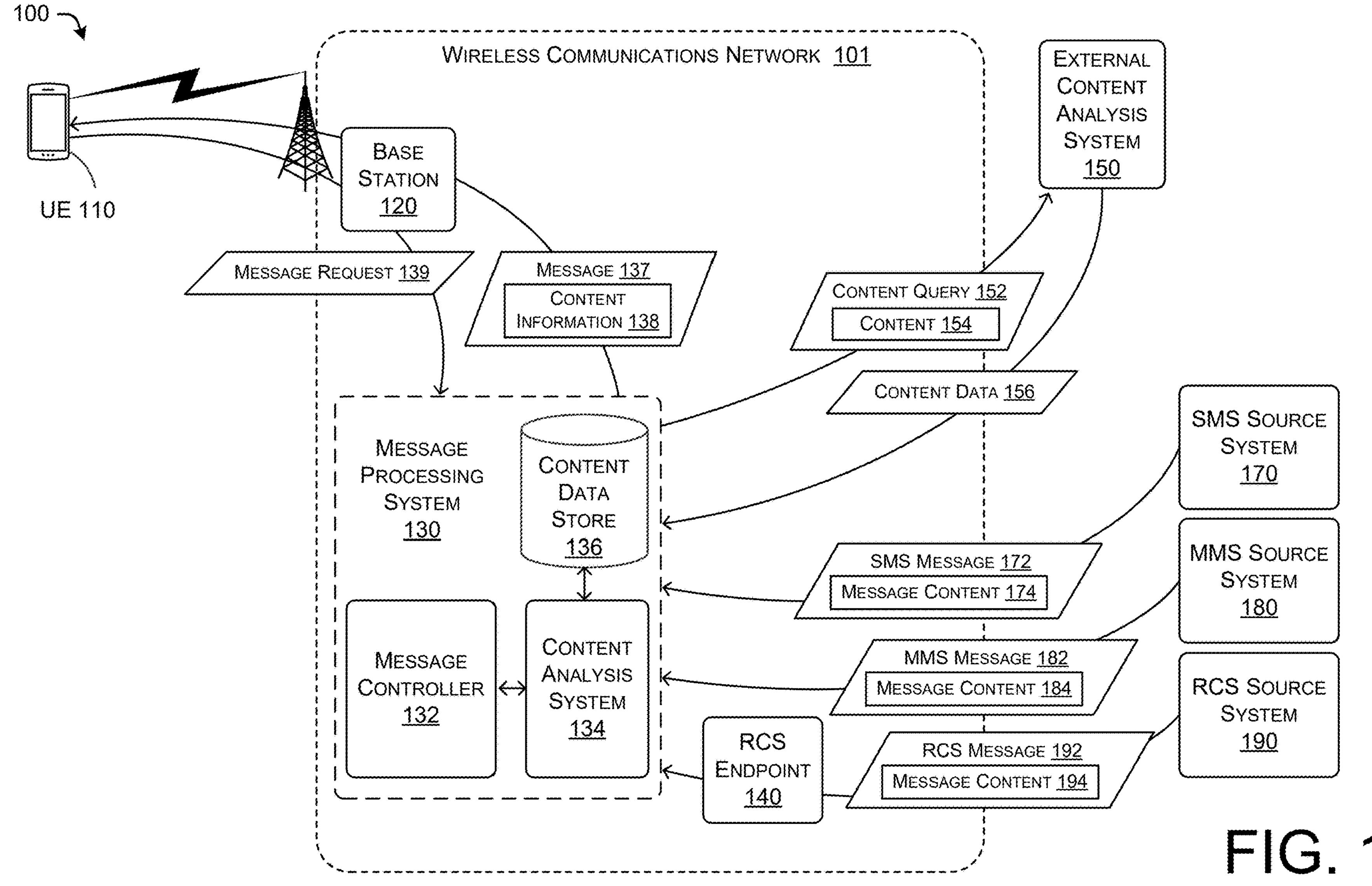
FIG. 1 is a schematic diagram of an illustrative wireless communication network environment in which systems and techniques for enhanced message content security may be implemented, in accordance with examples of the disclosure.

This disclosure is directed in part to systems and techniques for enhancing the security of communications of various types that may be received at a user equipment (UE) (e.g., smartphone, cell phone, mobile device, wireless communication device, mobile station, etc.) in advanced wireless communications networks. Such advanced networks include networks that support one or more 3GPP standards, including, but not limited to, Long Term Evolution (LTE) networks (e.g., 4G LTE networks), New Radio (NR) networks (e.g., 5G NR networks, 5G Advanced NR networks), and 6G networks. However, the disclosed systems and techniques may be applicable in any network or system in which a user device may receive communications that may include activatable content of any type via any type of service and/or system using any protocol.

A UE may be configured to receive and transmit messages of various types, including text messages (e.g., short messaging service (SMS) messages) and multimedia messages (e.g., multimedia message service (MMS) messages, rich communications services (RCS) messages, enhanced message service (EMS) messages, etc.). Such messages may include content that may include controls that may be activated by a user to initiate one or more actions on a UE and/or that may automatically initiate one or more actions on a UE. For example, a text message or a multimedia message may include a uniform resource locator (URL). By selecting or otherwise activating a URL included within a message, a user may initiate the execution of a web browser or other application configured on the UE that may then attempt interaction with a remote system or server associated with the URL (e.g., with a system located at an address indicated or represented by the URL).

While text and multimedia messages may be convenient and efficient means of communications between users known to one another, unsolicited messages used for marketing, advertising, and malicious purposes have become common. For example, "smishing" messages that include content intended to cause a user to provide personal information may be received from unscrupulous sources. Such messages often include a URL that, when activated, will cause a UE's web browser to interact with a website that attempts to solicit or otherwise obtain personal information from a user. The operators of such websites may then use this personal information for fraudulent or malicious purposes.

In examples, a content analysis system configured in a wireless communications network may intercept and modify such messages to reduce the likelihood that a user is exposed to a malicious URL. The content analysis system may analyze messages before they are transmitted to a UE and determine if the message includes a URL and/or other potentially malicious activatable content. If such content is detected, the content analysis system may determine, based on various criteria, whether the content is likely malicious content. If so, the content analysis system may replace or modify the content within the message or otherwise modify the message so that the likely malicious content is rendered non-activatable. The content analysis system may then provide the modified message to a message controller for transmission to the intended destination UE.

In examples, a content analysis system may be in communications with and/or otherwise interoperate with a message controller. A "message controller" as used herein may be a short message service center (SMSC) servicing SMS messages; a multimedia message service center (MMSC) servicing MMS messages; a rich communications service center servicing RCS messages; any other type of service center, system, or function servicing any other types of messages, and/or any combination thereof. In various examples, a content analysis system and/its various components and/or functions as described herein may be configured at (e.g., as part of) a message controller. Alternatively or additionally, a content analysis system and/its various components and/or functions as described herein may be physically and/or logically distinct from a message controller.

A content analysis system may be configured to receive and analyze messages intended for destinations associated with a wireless communications network. For example, the content analysis system may be configured to receive and analyze messages destined for UE's serviced (e.g., directly) by the wireless communications network at which the content analysis system is configured. Such messages may be received at the wireless communications network from an external system or device via another network or from a system or device in relatively direct communication with the wireless communications network (e.g., a system or device with which the wireless communications network has established a wired or wireless communications session). Any suitable protocol may be used to receive such messages, including, but not limited to, short message peer-to-peer (SMPP), simple mail transfer protocol (SMTP), session initiation protocol (SIP), and real-time transport protocol (RTP). Message may also, or instead, be received as application-based messages, such as messages generated using third-party messaging applications (e.g., social media application messages).

In response to receiving or otherwise detecting a message, a content analysis system may perform an initial analysis to determine if the message contains activatable content. In various examples, the content analysis system may analyze textual content of the message to determine if a URL is represented within such content. Textual content may include user-readable textual content, such as text that is intended to be presented to the user, as well as metadata content, such as a URL that is embedded within or otherwise associated with an image or video and that may be activated by a user selecting the associated image or video. In examples, the content analysis system may determine the presence of a URL in a message by detecting a string of text in a defined URL format within the textual content of the message. If the content analysis system determines that there is no URL within or otherwise associated with the message, the content analysis system may forward or otherwise provide the message to the appropriate message controller for transmission to the destination UE.

If the content analysis system determines that the message includes a URL, the content analysis system may generate a cryptographic hash digest of the message body (e.g., not including headers, source and destination information, addresses, etc.) by executing a hash function using the message body as input to generate the digest as output. The system may also, or instead, determine a file size of the message body. The content analysis system may then compare the digest and/or file size to other digests and associated data that may be stored in a message content data store.

In examples, the content analysis system may maintain a content data store that stores hash digests of messages processed by the content analysis system and associated message data. For example, the content analysis system may store and associate, as an entry in the content data store, a URL detected in a message, a hash digest of the message associated with the URL, and a message detection counter indicating a number of received messages that are detected as including a matching URL and/or having a matching digest. The content analysis system may also include, in such entries, a token identifier. Alternatively or additionally, the content analysis system may use the URL as an identifier or key for entries in the message content data store.

If, when processing the message, the content analysis system does not determine a matching entry in the content data store (e.g., does not identify an entry with a digest matching the determine digest of the message and/or an entry with a URL matching the URL of the message), the content analysis system may generate a new entry with the digest and the corresponding URL. The content analysis system may also generate and increment a message detection counter (e.g., to one) for that entry. However, if the content analysis system determines a matching entry in the content data store (e.g., identifies an entry with a digest matching the determine digest of the message and/or an entry with a URL matching the URL of the message), the content analysis may increment (e.g., by one) the message detection counter associated with that entry.

In examples, if the content analysis system finds a matching entry for the message in the content data store, the content analysis system may determine if the message detection counter associated with the entry (e.g., after incrementing the counter based on the currently processed message) meets or exceeds a message detection counter threshold value. A relatively large number of messages having identical message bodies (and therefore identical digests) and/or associated with the same URL may indicate that such messages are smishing messages or otherwise malicious messages. Therefore, if the content analysis system processes a message associated with a relatively high number of identical messages, the system may determine that a URL within such a message is likely to be a malicious URL.

In examples, the system may maintain separate message detection counters and URL detection counters. This may allow the system to determine likely maliciousness based on either or both the number of times that a particular message (as represented by its digest) has been detected or a particular URL (that may be embedded in different messages) has been detected. Distinct corresponding thresholds for each of these may also be maintained and used to determine maliciousness in conjunction or independently.

Alternatively or additionally, the content analysis system may evaluate the URL against malicious URL that may be included within the content data store and/or other data store. For example, the content analysis system may include, with entries in the content data store, a malicious URL flag. This flag may be set when an entry's message detection counter meets or exceeds the message detection counter threshold value. Alternatively or additionally, the content analysis system may set malicious URL flag for an entry in the content data store when the system determines that the URL is malicious using other means.

In examples, the content analysis system may communicate with an external (e.g., third-party) content analysis system that may provide security data for various types of content. For instance, the system may query an external malicious URL database for the URL detected within the message and, if the URL is indicated as malicious in the external malicious URL database, may set the malicious URL flag for the corresponding entry in the content data store.

Alternatively or additionally, the content analysis system may perform pattern matching operations to determine whether the URL, which may be obfuscated, is malicious. For example, the URL may be represented in an alternate format, such as with an octal or hexadecimal representation. The system may convert or otherwise determine standard formatting for such obfuscated URLs and use the standardized version of the URLs to determine whether it is malicious (e.g., based on a counter value associated with the standardized version of the URL and/or data retrieved from an external malicious URL database).

Alternatively or additionally, the content analysis system may operate a machine-learned malicious URL detection model that may be trained to determine whether a URL is malicious based on training data that includes URLs and data indicating whether such URLs are malicious or non-malicious. The system may execute such a model using the URL detected within the message as input to generate an indication of the maliciousness of the URL as output. If the URL is indicated as malicious in the model output, the content analysis system may set the malicious URL flag for the corresponding entry in the content data store.

If the URL included in a message is not determined to be malicious, the content analysis system may provide the message intact to the appropriate message controller for transmission to the intended destination UE. However, if the URL is determined to be malicious, or as a default option, the content analysis system may modify the message to remove, disable, or replace the URL.

For example, the content analysis system may replace the URL with text such as "malicious URL redacted" in the message and provide the modified message to the appropriate message controller for transmission to the intended destination UE. The system may also, or instead, transmit an additional message to the destination UE (e.g., via the appropriate message controller) that may indicate that a URL was redacted from a message and may include other data that may allow a user to determine the particular massage from which the URL was redacted. In some examples, the system may generate a summary message indicating URL redactions from a plurality of messages. Such messages may include instructions to a user for retrieving the redacted URLs in the event that user wants to access the associated system despite the maliciousness determination (e.g., "log into your account to view redacted URLs," "a new URL redaction message is available in your message quarantine app," etc.).

If the URL is determined to be malicious, or as a default option, the content analysis system may also, or instead, store the message for possible user access (e.g., in the content data store or in a distinct quarantine data store). In examples, the content analysis system and/or the user's UE may be configured with a quarantine application ("app") that may be used to access intact messages determined to be malicious. For instance, the UE may be configured with an app that interacts with the content analysis system and/or a quarantine data store. This app may provide access to contact messages stored at the content analysis system and/or a quarantine data store that were transmitted to the UE as messages with redacted URLs.

By facilitating the efficient and accurate determination of malicious content in messages, systems and methods described herein can improve the security and increase the efficiency of network resources and UE resources, while improving the user experience by reducing the likelihood that malicious content is mistakenly activated. For example, the methods and systems described herein may be more efficient and/or more robust than conventional techniques, as they may increase the efficiency of UE and network resource utilization by facilitating the automatic redaction of malicious URLs and other content, thereby preventing the activation of such content and the accompanying undesired use of UE and network resources. Moreover, the methods and systems described herein provide a technological improvement over existing manual security measures by facilitating an automated process of determining malicious content in messages, removing the necessity of individual users to perform maliciousness determinations and the use of UE resources for performing such determinations (e.g., by requiring a user to manually query a malicious URL database, etc.). In addition to improving the efficiency of network and device resource utilization, the systems and methods described herein can provide more robust systems by, for example, preventing unnecessary and/or destructive execution of malicious code and preventing improper collection and use of personal information, thereby freeing network and user device resources for more productive operations.

Illustrative environments, signal flows, and techniques for implementing systems and techniques for enhanced message content security are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with a base station 120. While referred to as a "base station" for explanatory purposes herein, the base station 120 may be any type of base station, including, but not limited to, any type of base transceiver station (BTS), NodeB, eNodeB, gNodeB, etc. The base station 120 may communicate with other devices and elements in the core of a wireless communications network 101. The wireless communications network 101 may be any one or more networks that facilitate communications between devices of various types, such as computing devices and mobile devices (e.g., UEs). Various connections between devices in the network 101 may be wired, wireless, or a combination thereof. In various embodiments, the wireless communications network 101 may facilitate communications with one or more wireless devices, such as UE 110. The wireless communications network 101 may facilitate packet-based communications between such wireless devices and devices on the Internet and/or one or more systems and devices external to the wireless communications network 101. In examples, the wireless communications network 101 may facilitate messaging communications between devices, such as SMS messages, MMS messages, RCS messages, etc.

For example, the UE 110 may exchange text communications with a message processing system 130 and, in particular, a message controller 132. The message controller 132 may be and/or include an SMSC, an MMSC, and/or any other message controller or combination thereof. The message processing system 130 may include the message controller 132, a content analysis system 134 and/or a content data store 136. These components may be logically and/or physically distinct and/or combined in any manner.

The wireless communications network 101 may facilitate communications between the UE 110 and other internal and external systems and devices. For example, an SMS source system 170 may transmit an SMS message 172 with message content 174 to the UE 110 via the wireless communications network 101. The message content 174 may include a URL. The SMS source system 170 may be any device or system configured to generate and transmit an SMS message, such as a UE, computer, server, etc. The SMS source system 170 may be a device external to the wireless communications network 101 and may transmit the SMS message 172 via another (e.g., peer) network to the wireless communications network 101. Alternatively, the SMS source system 170 may be a device homed to the wireless communications network 101 and may transmit the SMS message 172 via a base station or other edge device configured at the wireless communications network 101.

Similarly, the MMS source system 180 may transmit an MMS message 182 with message content 184 to the UE 110 via the wireless communications network 101. The message content 184 may include a URL. The MMS source system 180 may be any device or system configured to generate and transmit an MMS message, such as a UE, computer, server, etc. The MMS source system 180 may be a device external to the wireless communications network 101 and may transmit the MMS message 182 via another (e.g., peer) network to the wireless communications network 101. Alternatively, the MMS source system 180 may be a device homed to the wireless communications network 101 and may transmit the MMS message 182 via a base station or other edge device configured at the wireless communications network 101.

Likewise, the RCS source system 190 may transmit an RCS message 192 with message content 194 to the UE 110 via the wireless communications network 101. The message content 194 may include a URL. The RCS source system 190 may be any device or system configured to generate and transmit an RCS message, such as a UE, computer, server, etc. The RCS source system 190 may be a device external to the wireless communications network 101 and may transmit the RCS message 192 via another (e.g., peer) network to the wireless communications network 101. Alternatively, the RCS source system 190 may be a device homed to the wireless communications network 101 and may transmit the RMS message 192 via a base station or other edge device configured at the wireless communications network 101. In examples, because an RCS message may be encrypted, the RCS message 192 may be transmitted to an RCS endpoint configured at the wireless communications network 101 that may be configured to decrypt the RCS message 140 for processing by the message processing system 130.

A message destined for the UE 110 (e.g., one or messages 172, 182, or 192) may be received at the message processing system 130. In examples, this message may initially be processed at the content analysis system 134 as described herein before being provided to the message controller 132 for transmission to the UE 110 via the base station 120.

For example, the content analysis system 134 may determine whether a URL is within or otherwise associated with the content of the message. If not, the content analysis system 134 may provide the message intact (e.g., with a message body and content as received) to the UE 110 as message 137, with content information 138 representing the intact and unaltered content of the received message.

If a URL is detected within the message by the content analysis system 134, the content analysis system 134 may perform one or more of the content security determination operations as described herein. For example, the content analysis system 134 may generate a hash digest for the message and determine whether there is an existing entry in the content data store 136 that matches the digest generated for the message. If not, the content analysis system 134 may create such an entry. The content analysis system 134 may increment a message detection counter of an entry corresponding to the hash digest (whether newly created or existing). As noted, a message detection counter may indicate a number of received messages associated with the particular URL and/or digest associated with the entry.

The content analysis system 134 may further determine whether the URL associated with the message is malicious using the various techniques described herein. For example, the content analysis system 134 may determine if a message detection counter associated with an entry in the content data store 136 matching the digest for the received message meets or exceeds a message detection counter threshold value.

Alternatively or additionally, the content analysis system 134 may determine if the URL associated with the message has been determined to be malicious based on communication with an external content analysis system 150. The external content analysis system 150 may include a malicious URL database. The content analysis system 134 may transmit a content query 152, including content 154 that may represent a URL, to the external content analysis system 150. The content query 152 may include one or more instructions requesting malicious content data associated with the content 154 from the external content analysis system 150. The external content analysis system 150 may respond with content data 156 that may include data indicating the maliciousness of the content 154. For instance, the content data 156 may indicate that a URL represented in the content 154 is a malicious URL, is not a malicious URL, or is of undetermined maliciousness.

Alternatively or additionally, the content analysis system 134 may execute a machine-learned model using the URL and/or the message body as input to generate output that includes maliciousness data for the URL and/or message body.

The content analysis system 136 may store the determined maliciousness data for the URL in the content data store 136. In examples, this may include setting a malicious flag for an entry associated with the URL (or determining not to set such a flag).

If the content analysis system 134 determines that the URL associated with the message is malicious, or otherwise does not determine that the URL is not malicious (e.g., as a default action), the content analysis system 134 may modify the message to redact the URL or otherwise render it non-activatable. The content analysis system 134 may then transmit or otherwise provide the modified message to the message controller 132 for transmission to the UE 110 via the base station 120. For example, the message controller 132 may transmit the modified message as message 137, including content information 138 that may indicate that a URL was redacted from the message, to the UE 110 via the base station 120.

The content analysis system 134 may also store the original message (e.g., intact with the URL unmodified), in some examples at the content data store 136, while in other examples at a separate quarantine data store. This may allow the recipient user to view the original message if desired. For example, the user may operate the UE 110 to transmit the message request 139 to the message processing system that may then retrieve the original message or otherwise present the original message to the user at the UE 110. In examples, the message request 139 may be an instruction from an app configured at the UE 110 to retrieve the original message from the content data store 136 and/or from a quarantine data store.

Note that the components, systems, services, and functions represented in the environment 100 are an exemplary subset of components, systems, services, and functions that may be configured in a wireless communications environment. One skilled in the art will recognize that many other components, systems, services, and functions may be configured in such an environment and interact with the components, systems, services, and functions represented in FIG. 1.

Illustrative Signal Flows

Figure 2:
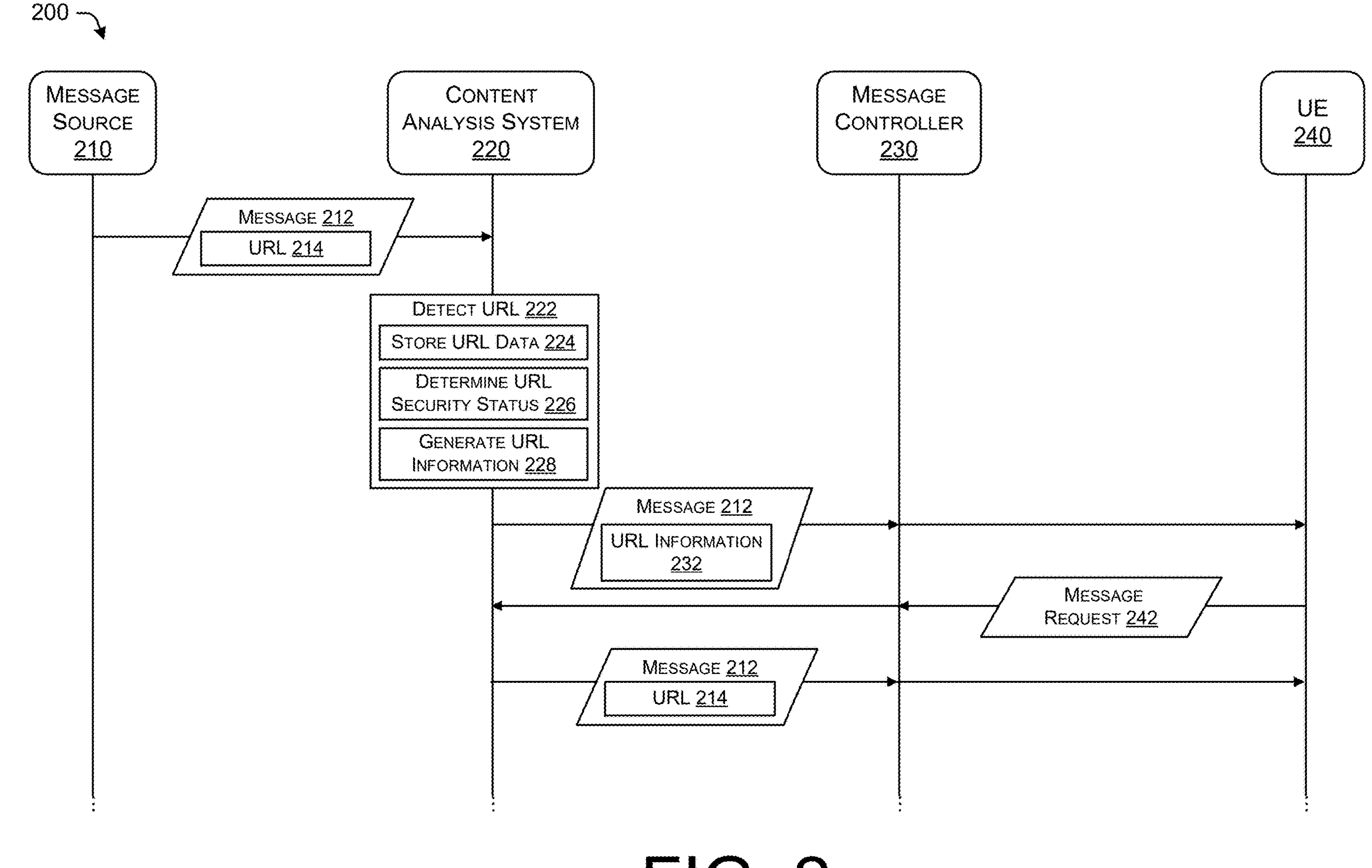
FIG. 2 is a diagram of an illustrative signal flow associated with systems and techniques for enhanced message content security, in accordance with examples of the disclosure.

FIG. 2 illustrates an exemplary signal flow 200 of various messages that may be exchanged in one or more of the disclosed systems and techniques for enhancing message content security. Reference may be made in this description of the signal flow 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

A message source 210 may transmit a message 212 including a URL 214 to a UE 240. The message source 210 may be any device or system configured to transmit messages (e.g., SMS messages, MMS, messages, RCS messages, etc.) to another device. The message 212 may be any type of message (e.g., SMS message, MMS message, RCS message, etc.) capable of including content such as a URL.

The message 212 may be received at the content analysis system 220. The content analysis system 220 may perform the URL detection operations 222 in response to determining that the message 212 includes the URL 214. Among these operations may be store URL data operation 224, in which the content analysis system 220 may generate a cryptographic hash digest of the body of the message 212 and determine if the digest is represented in a content data store as described herein. The content analysis system 220 may either add the digest and related information to the content data store if there is no existing entry and/or increment a corresponding message detection counter.

The content analysis system 220 may also, or instead, determine the security status of the URL at operation 226 as described herein. For example, the URL security status, or maliciousness, may be determined by the content analysis system 220 based on the corresponding message detection counter and whether that counter has met or exceeded a threshold value, maliciousness data determined at an external content analysis system (e.g., a malicious URL database), local maliciousness data (e.g., stored at the content data store and/or based on maliciousness data determined at an external content analysis system), and/or based on output generated by a machine-learned malicious URL detection model using the URL and/or the body of the message 212 as input. Further at operation 222, the system may store the message 212 with its original URL 214 for possible future retrieval as described herein (e.g., at a content data store and/or a quarantine data store).

The content analysis system 220 may transmit the message 212 with modified content in the form of URL information 232 to the message controller 230. For example, the body of the message 212 may be substantially unchanged other than the redaction of the URL 214 and the inclusion of an indication of the redaction as the URL information 232. The modified message 212 may be transmitted from the message controller 230 to the UE 240.

In response to viewing the modified message 212, a user to the UE 240 may operate the UE to access the original message. For example, the user may execute an app on the UE 240 that generates instructions, such as message request 242, that requests presentation of the unredacted original message 212. The message controller 230 may provide the message request 242 to the content analysis system 220. The content analysis system 220 may retrieve (e.g., from the content data store and/or from the quarantine data store) the message 212 intact with URL 214 and transmit it to the message controller 230. The message controller 230 may then transmit the message 212 with the URL 214 to the URL 240.

Illustrative Operations

Figure 3:
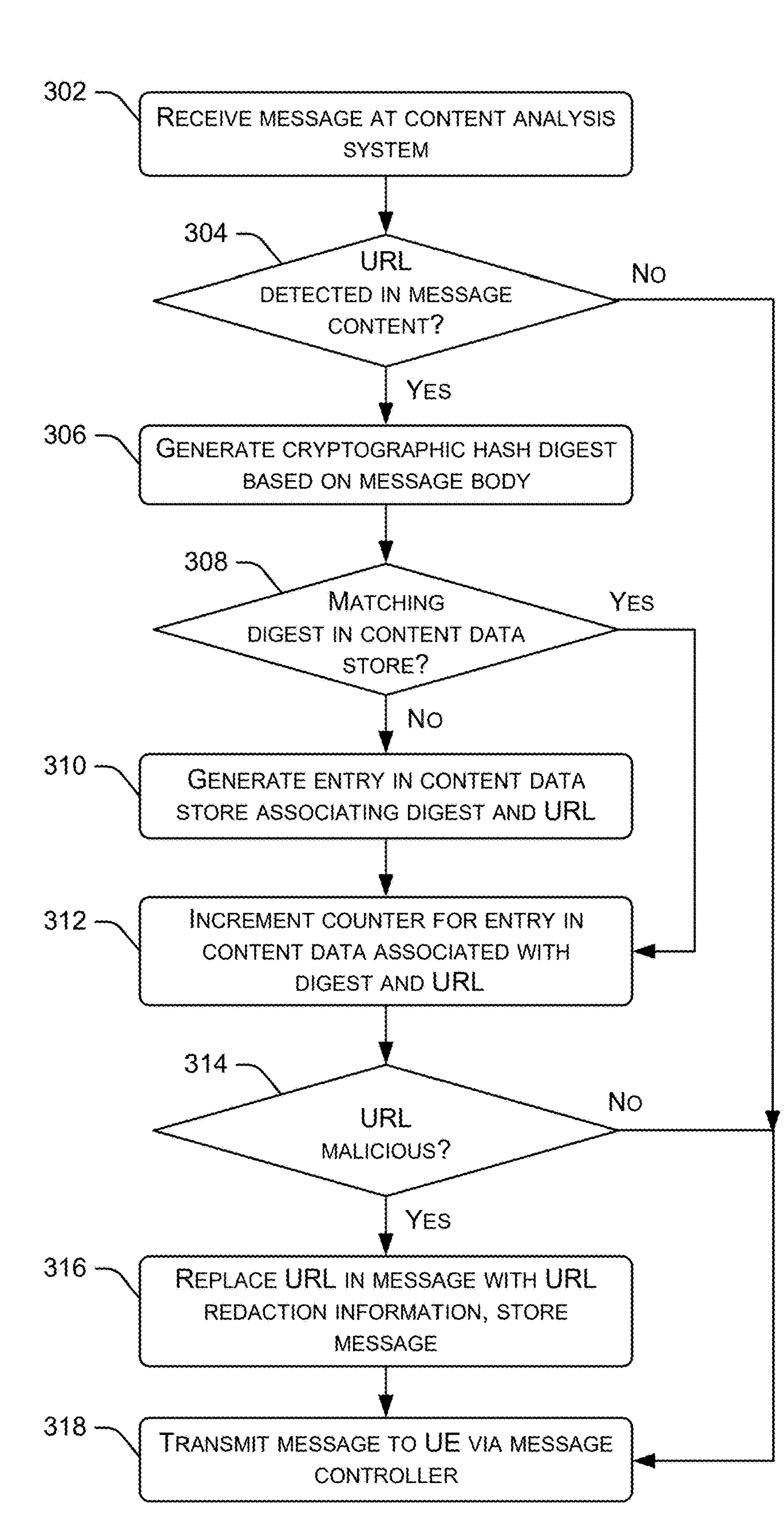
FIG. 3 is a flow diagram of an illustrative process for enhancing message content security, in accordance with examples of the disclosure.

FIG. 3 shows a flow diagram of an illustrative process 300 for implementing enhanced message content security according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 may be described with reference to the wireless network environment 100 of FIG. 1; however other environments may also be used.

At block 302, a content analysis system, for example configured at a message processing system in a wireless communications network, may receive a message (e.g., SMS message, MMS, message, RCS message, etc.). The message may be intended for a UE (e.g., include a destination address or number associated with a UE or a user of a UE).

At block 304, the content analysis system may determine if the message includes a URL. For example, the content analysis system may process textual content of the message to detect a string of text in a URL format. Alternately or additionally, the content analysis system may process textual metadata, such as data associated with an image or video in a multimedia message, to detect a string of text in a URL format. The content analysis system may further determine URLs represented in alternate formats, such as an octal or hexadecimal representation. If the message does not contain a URL, the content analysis system may provide the message intact to a message controller at block 318 for transmission to the destination UE.

If the system determines, at block 304, that the message includes a URL, at block 306 the system may generate a cryptographic hash digest based on the message body (e.g., excluding headers, addresses, control information, etc.). For example, the content analysis system may generate a cryptographic hash digest by executing a hash function using the message body as input to generate the digest as output. The system may also, or instead, determine a file size of the message body and/or other message data at block 306.

At block 308, the content analysis system may then compare the digest to one or more other digests stored in a message content data store to determine if the digest matches an existing digest. If the digest does not match an existing digest, at block 310, the system may generate an entry in the content data store for the digest. The system may store and associate the digest and the detected URL in the content data store. The system may also or instead store other data associated with the digest and/or the URL. The system may further initialize a malicious URL flag and/or a message detection counter for the entry.

If, at block 308, the system determines that the generated digest matches an existing digest and/or after generating an entry in the content data store for the digest where no matching digest was found, at block 312 the system may increment the message detection counter for the corresponding entry.

At block 314, the content analysis system may determine whether the URL is malicious, as described in more detail herein. For example, the content analysis system may determine whether the corresponding message detection counter meets or exceeds a threshold value, whether maliciousness data determined at an external content analysis system (e.g., a malicious URL database) indicates that the URL is malicious, whether local maliciousness data (e.g., stored at the content data store and/or based on maliciousness data determined at an external content analysis system) indicates that the URL is malicious, and/or whether output generated by a machine-learned malicious URL detection model using the URL and/or the body of the message 212 as input indicates that the URL is malicious. If the content analysis system determines that the URL is not malicious, the content analysis system may provide the message intact to a message controller at block 318 for transmission to the destination UE.

If, at block 316, the content analysis system determines that the URL is malicious or at least cannot be determined to not be malicious, at block 316, the system may redact the URL from the message and replace the URL with other textual content. For example, the content analysis system may replace the URL with text such as "malicious URL redacted" in the message and provide the modified message to the appropriate message controller for transmission to the intended destination UE. Further at block 316, the system may store the message with its original URL for possible future retrieval as described herein (e.g., at a content data store and/or a quarantine data store).

The system may also, or instead, at block 316 in some examples, transmit an additional message to the destination UE (e.g., via the appropriate message controller) that may indicate that a URL was redacted from a message and may include other data that may allow a user to determine the particular massage from which the URL was redacted. In some examples, the system may generate a summary message indicating URL redactions from a plurality of messages. Such messages may include instructions to user for retrieving the redacted URLs in the event that user wants to access the associated system despite the maliciousness determination (e.g., "log into your account to view redacted URLs," "a new URL redaction message is available in your message quarantine app," etc.).

The content analysis system may provide the modified message, including any content indicating that the URL has been redacted, to a message controller at block 318 for transmission to the destination UE.

Figure 4:
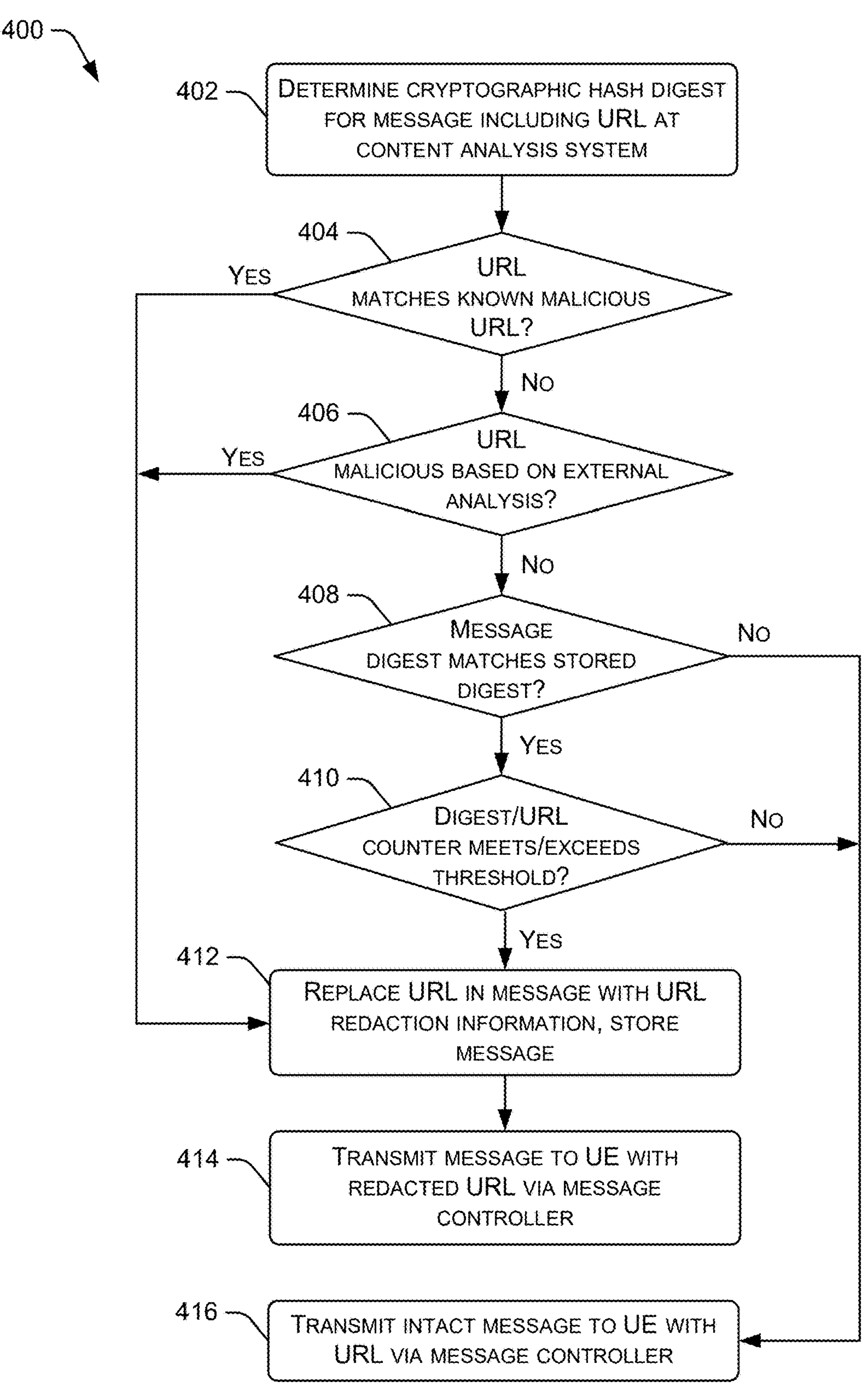
FIG. 4 is a flow diagram of an illustrative process for determining message content security, in accordance with examples of the disclosure.

FIG. 4 shows a flow diagram of an illustrative process 400 for implementing enhanced message content security according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 may be described with reference to the wireless network environment 100 of FIG. 1; however other environments may also be used.

At block 402, a content analysis system, for example configured at a message processing system in a wireless communications network, may generate a cryptographic hash digest of a message body (e.g., not including headers, source and destination information, addresses, etc.) by executing a hash function using the message body as input to generate the digest as output, for example, based on determining that the associated message includes a URL.

At block 404, the content analysis system may determine if the detected URL matched a known malicious URL, for example, represented in a content data store. For example, the system may determine if the URL matches a URL represented in the data store and, if so, may determine if a malicious URL flag associated with that URL is set (e.g., indicates that the URL is malicious).

If the URL matches a malicious URL, the content analysis system may, at block 412, redact the malicious URL from the message and replace the redacted URL with URL redaction information that may indicate to the user that the URL has been redacted. The system may further at block 412 store the original, intact message for potential future retrieval (e.g., at the content data store and/or at a quarantine data store). At block 414, the system may then transmit the modified (e.g., URL-redacted) message to the destination UE via the appropriate message controller.

If, at block 404, the content analysis system does not determine that the detected URL matched a known malicious URL, for example, based on local data (e.g., represented in a content data store), or in conjunction with checking the URL against local data, at block 406, the content analysis system communicate with an external (e.g., third-party) content analysis system to determine if the URL is malicious. For instance, the system may query an external malicious URL database for the URL and determine whether the URL is malicious based on the responsive data received from the database. If the URL is indicated as malicious by the external content analysis system, the content analysis system may set the malicious URL flag for the corresponding entry in the content data store.

If the URL is indicated as a malicious URL by the external content analysis system, the content analysis system may, at block 412, redact the malicious URL from the message and replace the redacted URL with URL redaction information that may indicate to the user that the URL has been redacted. The system may further, at block 412, store the original, intact message for potential future retrieval (e.g., at the content data store and/or at a quarantine data store). At block 414, the system may then transmit the modified (e.g., URL-redacted) message to the destination UE via the appropriate message controller.

If, at block 406, the content analysis system does not determine that the detected URL is a malicious URL, for example, based on data received from an external content analysis system, or in conjunction with checking the URL against local data and/or external content analysis data, at block 408, the content analysis system determine whether the digest associated with the message matches any other digest stored in the content data store. If the digest does not match a digest in the data store, and the URL is not malicious (e.g., based on the operations of blocks 404 and/or 406), at block 416 the system may transmit the unmodified (e.g., with URL intact) message to the destination UE via the appropriate message controller.

If, at block 408, the content analysis system determines that the digest associated with the message matches another digest stored in the content data store, the system may increment a message detection counter for the corresponding entry (e.g., associated with the digest and/or the corresponding URL) in the content data store. The system may then determine, at block 410, whether the counter value meets or exceeds a message detection counter threshold value. If the message detection counter value does not meet or exceed the message detection counter threshold value, and the URL is not malicious (e.g., based on the operations of blocks 404 and/or 406), at block 416 the system may transmit the unmodified (e.g., with URL intact) message to the destination UE via the appropriate message controller.

If the message detection counter value meets or exceeds the message detection counter threshold value, at block 412, the content analysis system may redact the malicious URL from the message and replace the redacted URL with URL redaction information that may indicate to the user that the URL has been redacted. The content analysis system may also store the original, intact message for potential future retrieval (e.g., at the content data store and/or at a quarantine data store). At block 414, the system may then transmit the modified (e.g., URL-redacted) message to the destination UE via the appropriate message controller.

In summary, by more efficiently and automatically detecting URLs and other activatable content in messages and determining maliciousness of such URLs and content, the disclosed systems and techniques may be able to improve the security of messaging technology of various types while improving the efficiency of the usage of user equipment resources and wireless network resources, improving the user experience and performance of both the network and user devices.

Example User Equipment

Figure 5:
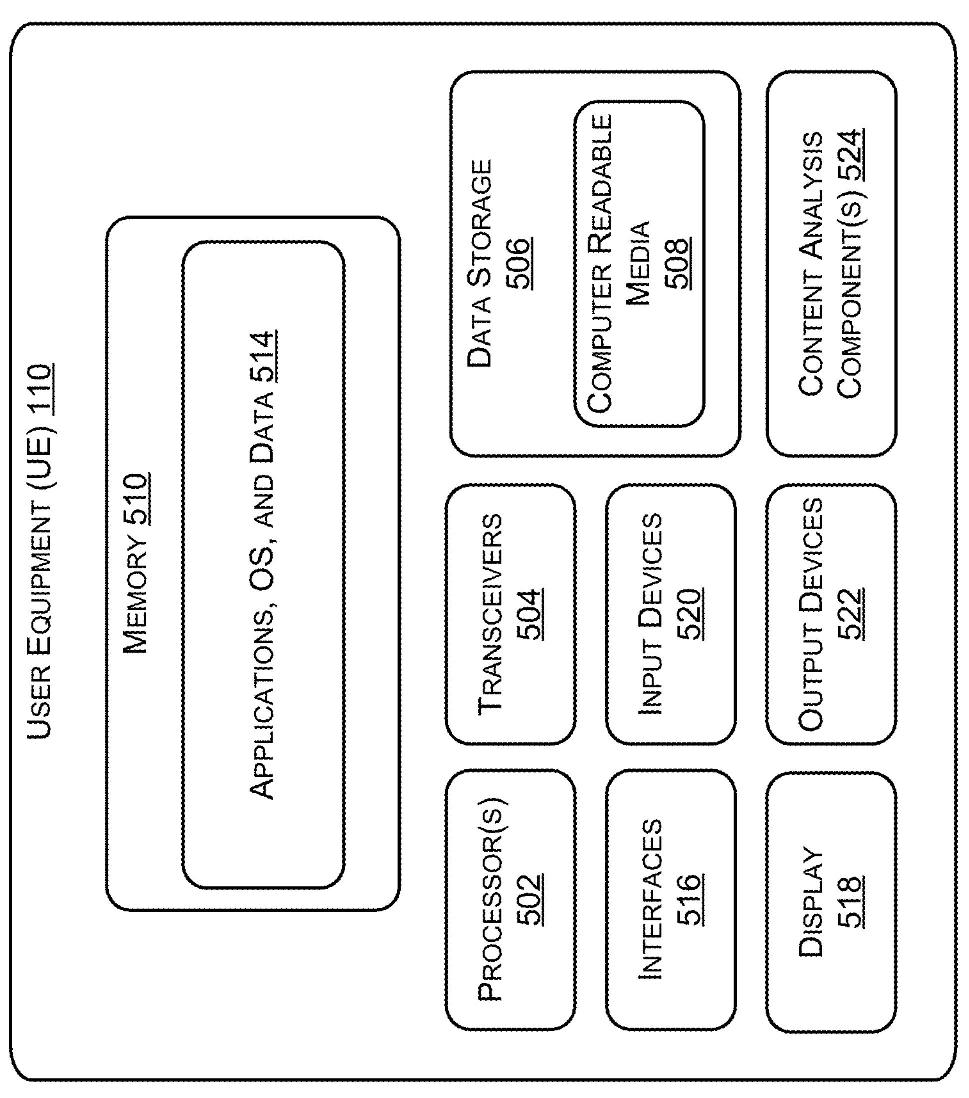
FIG. 5 is a schematic diagram of illustrative components in an example user device that is configured for testing emergency communications using short codes, in accordance with examples of the disclosure.

FIG. 5 is an example of a UE, such as UE 110, for use with the systems and methods disclosed herein, in accordance with some examples of the present disclosure. The UE 110 may include one or more processors 502, one or more transmit/receive antennas (e.g., transceivers or transceiver antennas) 504, and a data storage 506. The data storage 506 may include a computer readable media 508 in the form of memory and/or cache. This computer-readable media may include a non-transitory computer-readable media. The processor(s) 502 may be configured to execute instructions, which can be stored in the computer readable media 508 and/or in other computer readable media accessible to the processor(s) 502. In some configurations, the processor(s) 502 is a Central Processing Unit (CPU), a Graphics Processing Unit (GPU), or both CPU and GPU, or any other sort of processing unit. The transceiver antenna(s) 504 can exchange signals with a base station, such as base station 120.

The UE 110 may be configured with a memory 510. The memory 510 may be implemented within, or separate from, the data storage 506 and/or the computer readable media 508. The memory 510 may include any available physical media accessible by a computing device to implement the instructions stored thereon. For example, the memory 510 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 510 can store several modules, such as instructions, data stores, and so forth, that are configured to execute on the processor(s) 502. In configurations, the memory 510 may also store one or more applications 514 configured to receive and/or provide voice, data, and messages (e.g., SMS messages, MMS messages, Instant Messaging (IM) messages, EMS messages, RCS messages, etc.) to and/or from another device or component (e.g., the base station 120; message source systems 170, 180, 190). The applications 514 may also include one or more operating systems and/or one or more third-party applications that provide additional functionality to the UE 110.

Although not all illustrated in FIG. 5, the UE 110 may also comprise various other components, e.g., a battery, a charging unit, one or more network interfaces 516, an audio interface, a display 518, a keypad or keyboard, and one or more input devices 520, and one or more output devices 522. The UE 110 may further include one or more content analysis components 524 that may be configured to perform content analysis and/or message content retrieval operations as described herein for enhancing message content security.

Example Computing Device

Figure 6:
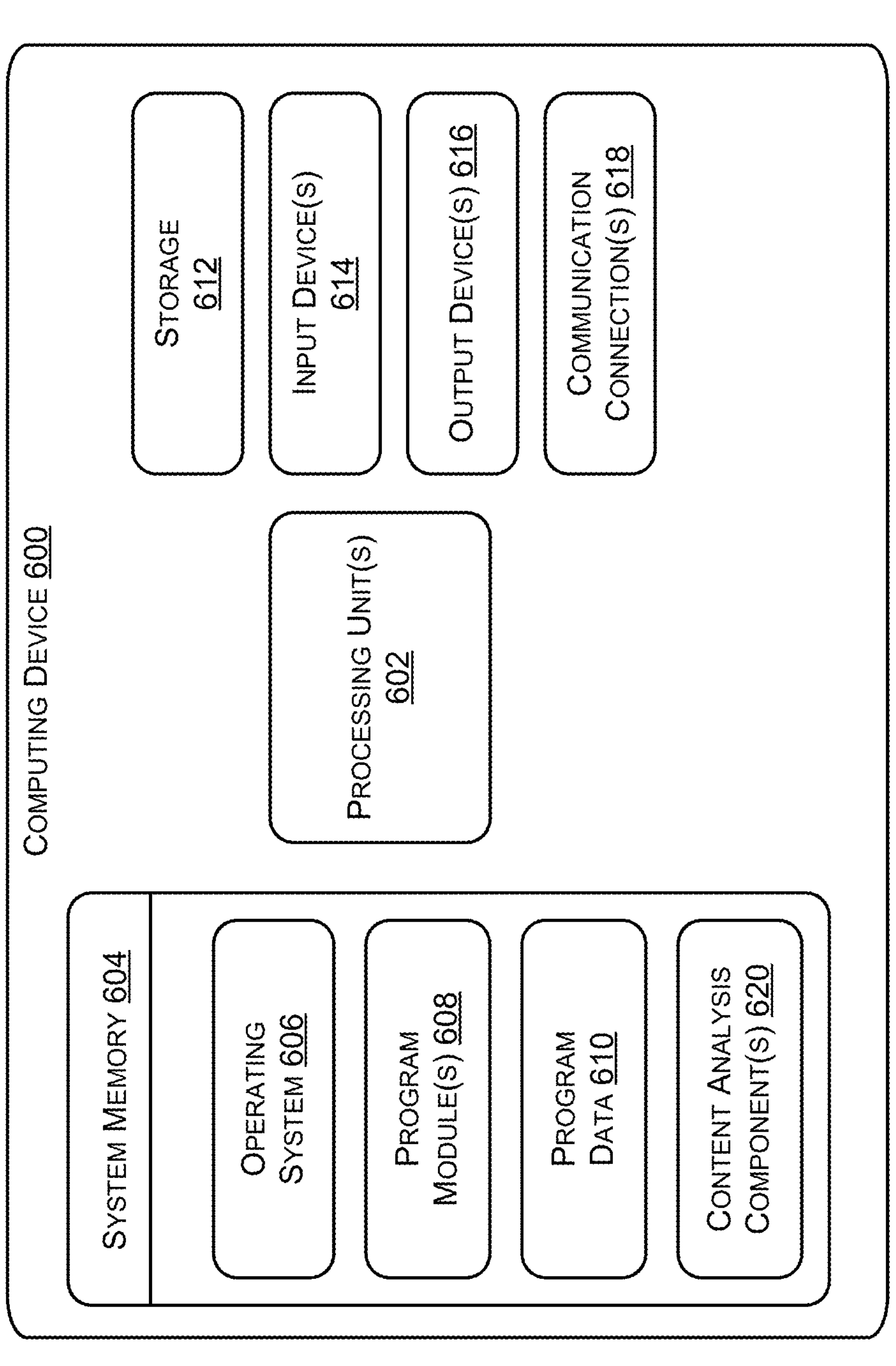
FIG. 6 is a schematic diagram of illustrative components in an example computing device that is configured for testing emergency communications using short codes, in accordance with examples of the disclosure.

FIG. 6 is an example of a computing device 600 for use with the systems and methods disclosed herein, in accordance with some examples of the present disclosure. The computing device 600 can be used to implement various components of a core network, a base station, and/or any servers, routers, gateways, gateway elements, administrative components, etc. that can be used by a communication provider. One or more computing devices 600 can be used to implement the network 101, for example. One or more computing devices 600 can also be used to implement base stations and other components, such as the content analysis system 134, the message controller 132, the content data store 136, and/or any other component of the message processing system 130.

In various embodiments, the computing device 600 can include one or more processing units 602 and system memory 604. Depending on the exact configuration and type of computing device, the system memory 604 can be volatile (such as RAM), non-volatile (such as ROM, flash memory, etc.) or some combination of the two. The system memory 604 can include an operating system 606, one or more program modules 608, program data 610, and one or more content analysis components 620. The system memory 604 may be secure storage or at least a portion of the system memory 604 can include secure storage. The secure storage can prevent unauthorized access to data stored in the secure storage. For example, data stored in the secure storage can be encrypted or accessed via a security key and/or password.

The computing device 600 can also include additional data storage devices (removable and/or non-removable) such as, for example, magnetic disks, optical disks, or tape. Such additional storage is illustrated in FIG. 6 by storage 612.

Non-transitory computer storage media of the computing device 600 can include volatile and nonvolatile, removable and non-removable media implemented in any method or technology for storage of information, such as computer readable instructions, data structures, program modules, or other data. The system memory 604 and storage 612 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 600. Any such non-transitory computer readable storage media can be part of the computing device 600.

In various embodiment, any or all of the system memory 604 and storage 612 can store programming instructions which, when executed, implement some or all of the functionality described above as being implemented by one or more systems configured in the environment 100 and/or components of the network 101.

The computing device 600 can also have one or more input devices 614 such as a keyboard, a mouse, a touch-sensitive display, voice input device, etc. The computing device 600 can also have one or more output devices 616 such as a display, speakers, a printer, etc. can also be included. The computing device 600 can also contain one or more communication connections 618 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method performed by a content analysis system, the method comprising receiving, at a processor configured at the content analysis system, a first message comprising textual content; determining, by the processor, a uniform resource locator (URL) within the textual content; generating, by the processor, a cryptographic hash digest based at least in part on the textual content; determining, by the processor and based at least in part on a content data store and the cryptographic hash digest, a maliciousness of the URL; generating, by the processor and based at least in part on the maliciousness of the URL, a second message by redacting the URL from the first message; and transmitting, from the processor to a message controller, the second message for transmission to a user equipment (UE).

B: The method of paragraph A, wherein determining the maliciousness of the URL comprises determining that the URL is malicious when a malicious URL flag is set for an entry associated with the cryptographic hash digest in the content data store.

C: The method of paragraph B, further comprising transmitting a query comprising the URL to a malicious URL database; and setting the malicious URL flag for the entry associated with the cryptographic hash digest in the content data store based at least in part on a response received for the malicious URL database.

D: The method of any of paragraphs A-C, wherein determining the maliciousness of the URL comprises determining that the URL is malicious when a message detection counter associated with an entry corresponding to the cryptographic hash digest in the content data store meets or exceeds a message detection counter threshold value, the message detection counter indicating a number of received messages that are detected as at least one of including a matching URL to the URL or having a matching digest to the cryptographic hash digest.

E: The method of any of paragraphs A-D, wherein the first message further comprises at least one of image content or video content, and the textual content comprises metadata associated with at least one of the image content or the video content.

F: The method of any of paragraphs A-E, further comprising receiving, at the processor, a third message comprising second textual content; determining, by the processor, that the second textual content excludes any URL; and transmitting, from the processor to the message controller and based at least in part on determining that the second textual content excludes any URL, the third message for transmission to a second UE.

G: A content analysis system comprising one or more processors; one or more transceivers; and non-transitory computer-readable media storing computer-executable instructions that, when executed by the one or more processors, cause the one or more processors to perform operations comprising receiving a first message comprising textual content; determining a uniform resource locator (URL) within the textual content; generating a cryptographic hash digest based at least in part on the textual content; modifying an entry in a content data store based at least in part on the cryptographic hash digest; determining a maliciousness of the URL; generating, based at least in part on the maliciousness of the URL, a second message by redacting the URL from the first message; and transmitting the second message to a message controller for transmission to a user equipment (UE).

H: The content analysis system of paragraph G, wherein modifying the entry in the content data store comprising generating the entry in the content data store based at least in part on determining that the cryptographic hash digest is not represented in the content data store.

I: The content analysis system of paragraph G or H, wherein modifying the entry in the content data store comprising incrementing a message detection counter associated with the entry in the content data store based at least in part on determining that the cryptographic hash digest is represented in the entry in the content data store.

J: The content analysis system of paragraph I, wherein determining the maliciousness of the URL comprises determining that the URL is malicious when the message detection counter meets or exceeds a message detection counter threshold value, the message detection counter indicating a number of received messages that are detected as at least one of including a matching URL to the URL or having a matching digest to the cryptographic hash digest.

K: The content analysis system of any of paragraphs G-J, wherein determining the maliciousness of the URL comprises querying a remote malicious URL database for maliciousness data associated with the URL.

L: The content analysis system of paragraph K, wherein determining the maliciousness of the URL further comprises setting a malicious URL flag associated with the entry in the content data store based at least in part on the maliciousness data associated with the URL.

M: The content analysis system of any of paragraphs G-L, wherein the first message further comprises at least one of image content or video content, and the textual content comprises metadata associated with at least one of the image content or the video content.

N: The content analysis system of any of paragraphs G-M, wherein the second message is further generated by replacing the URL with URL redaction information.

O: A non-transitory computer-readable media storing computer-executable instructions that, when executed by one or more processors, cause the one or more processors to perform operations comprising receiving a first message comprising textual content; determining a uniform resource locator (URL) within the textual content; generating a cryptographic hash digest based at least in part on the textual content; modifying an entry in a content data store based at least in part on the cryptographic hash digest; determining a maliciousness of the URL; generating, based at least in part on the maliciousness of the URL, a second message by redacting the URL from the first message; and transmitting the second message to a message controller for transmission to a user equipment (UE).

P: The non-transitory computer-readable media of paragraph O, wherein the operations further comprise receiving a third message comprising second textual content; determining that the second textual content excludes any URL; and transmitting, the third message to the message controller for transmission to a second UE based at least in part on determining that the second textual content excludes any URL.

Q: The non-transitory computer-readable media of paragraph O or P, wherein the second message is further generated by replacing the URL with URL redaction information.

R: The non-transitory computer-readable media of any of paragraphs O-Q, wherein the operations further comprise receiving a request for the first message from the UE; and in response to the request, transmitting the first message comprising the textual content to the UE.

S: The non-transitory computer-readable media of any of paragraphs O-R, wherein modifying the entry in the content data store comprises incrementing a message detection counter associated with the entry in the content data store based at least in part on determining that the cryptographic hash digest is represented in the entry in the content data store, the message detection counter indicating a number of received messages that are detected as at least one of including a matching URL to the URL or having a matching digest to the cryptographic hash digest; and determining that the URL is malicious when the message detection counter meets or exceeds a message detection counter threshold value.

T: The non-transitory computer-readable media of any of paragraphs O-S, wherein the first message further comprises at least one of image content or video content, and the textual content comprises metadata associated with at least one of the image content or the video content.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

Conclusion

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a content analysis system, the method comprising:

receiving, at a processor configured at the content analysis system, a first message comprising textual content;

determining, by the processor, a uniform resource locator (URL) within the textual content;

generating, by the processor, a cryptographic hash digest based at least in part on the textual content;

determining, by the processor and based at least in part on a content data store and the cryptographic hash digest, a maliciousness of the URL, wherein determining the maliciousness of the URL comprises determining that the URL is malicious when a message detection counter associated with an entry corresponding to the cryptographic hash digest in the content data store meets or exceeds a message detection counter threshold value, the message detection counter indicating a number of received messages that are detected as having a matching digest to the cryptographic hash digest;

generating, by the processor and based at least in part on the maliciousness of the URL, a second message by redacting the URL from the first message; and transmitting, from the processor to a message controller, the second message for transmission to a user equipment (UE).

2. The method of claim 1, wherein determining the maliciousness of the URL comprises determining that the URL is malicious when a malicious URL flag is set for an entry associated with the cryptographic hash digest in the content data store.

3. The method of claim 2, further comprising:

transmitting a query comprising the URL to a malicious URL database; and setting the malicious URL flag for the entry associated with the cryptographic hash digest in the content data store based at least in part on a response received for the malicious URL database.

4. The method of claim 1, wherein:

the first message further comprises at least one of image content or video content, and the textual content comprises metadata associated with at least one of the image content or the video content.

5. The method of claim 1, further comprising:

receiving, at the processor, a third message comprising second textual content;

determining, by the processor, that the second textual content excludes any URL; and transmitting, from the processor to the message controller and based at least in part on determining that the second textual content excludes any URL, the third message for transmission to a second UE.

6. A content analysis system comprising:

one or more processors;

one or more transceivers; and non-transitory computer-readable media storing computer-executable instructions that, when executed by the one or more processors, cause the one or more processors to perform operations comprising:

receiving a first message comprising textual content;

determining a uniform resource locator (URL) within the textual content;

generating a cryptographic hash digest based at least in part on the textual content;

modifying an entry in a content data store based at least in part on the cryptographic hash digest;

determining a maliciousness of the URL, wherein determining the maliciousness of the URL comprises determining that the URL is malicious when the message detection counter meets or exceeds a message detection counter threshold value, the message detection counter indicating a number of received messages that are detected as having a matching digest to the cryptographic hash digest;

generating, based at least in part on the maliciousness of the URL, a second message by redacting the URL from the first message; and transmitting the second message to a message controller for transmission to a user equipment (UE).

7. The content analysis system of claim 6, wherein modifying the entry in the content data store comprises generating the entry in the content data store based at least in part on determining that the cryptographic hash digest is not represented in the content data store.

8. The content analysis system of claim 6, wherein modifying the entry in the content data store comprises incrementing a message detection counter associated with the entry in the content data store based at least in part on determining that the cryptographic hash digest is represented in the entry in the content data store.

9. The content analysis system of claim 6, wherein determining the maliciousness of the URL comprises querying a remote malicious URL database for maliciousness data associated with the URL.

10. The content analysis system of claim 9, wherein determining the maliciousness of the URL further comprises setting a malicious URL flag associated with the entry in the content data store based at least in part on the maliciousness data associated with the URL.

11. The content analysis system of claim 6, wherein:

the first message further comprises at least one of image content or video content, and the textual content comprises metadata associated with at least one of the image content or the video content.

12. The content analysis system of claim 6, wherein the second message is further generated by replacing the URL with URL redaction information.

13. A non-transitory computer-readable media storing computer-executable instructions that, when executed by one or more processors, cause the one or more processors to perform operations comprising:

receiving a first message comprising textual content;

determining a uniform resource locator (URL) within the textual content;

generating a cryptographic hash digest based at least in part on the textual content;

modifying an entry in a content data store based at least in part on the cryptographic hash digest, wherein modifying the entry in the content data store comprises incrementing a message detection counter associated with the entry in the content data store based at least in part on determining that the cryptographic hash digest is represented in the entry in the content data store, the message detection counter indicating a number of received messages that are detected as having a matching digest to the cryptographic hash digest;

determining a maliciousness of the URL when the message detection counter meets or exceeds a message detection counter threshold value;

generating, based at least in part on the maliciousness of the URL, a second message by redacting the URL from the first message; and transmitting the second message to a message controller for transmission to a user equipment (UE).

14. The non-transitory computer-readable media of claim 13, wherein the operations further comprise:

receiving a third message comprising second textual content;

determining that the second textual content excludes any URL; and transmitting, the third message to the message controller for transmission to a second UE based at least in part on determining that the second textual content excludes any URL.

15. The non-transitory computer-readable media of claim 13, wherein the second message is further generated by replacing the URL with URL redaction information.

16. The non-transitory computer-readable media of claim 13, wherein the operations further comprise:

receiving a request for the first message from the UE; and in response to the request, transmitting the first message comprising the textual content to the UE.

17. The non-transitory computer-readable media of claim 13, wherein:

the first message further comprises at least one of image content or video content, and the textual content comprises metadata associated with at least one of the image content or the video content.

* * * * *